US008412826B2

(12) United States Patent
Lamb et al.

(10) Patent No.: US 8,412,826 B2
(45) Date of Patent: Apr. 2, 2013

(54) MESSAGE EXCHANGE BETWEEN SOFTWARE COMPONENTS

(75) Inventors: James A. Lamb, Elkhorn, NE (US); Joseph G. Giebler, Omaha, NE (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1914 days.

(21) Appl. No.: 11/085,377

(22) Filed: Mar. 21, 2005

(65) Prior Publication Data
US 2006/0225062 A1 Oct. 5, 2006

(51) Int. Cl.
G06F 15/16 (2006.01)
(52) U.S. Cl. ........................................ 709/226
(58) Field of Classification Search ............... 709/230, 709/228; 719/311, 313, 315, 328, 330; 718/100; 370/465–467, 469
See application file for complete search history.

(56) References Cited

U.S. PATENT DOCUMENTS

| | | | |
|---|---|---|---|
| 5,524,253 A | 6/1996 | Pham et al. | |
| 5,644,719 A | 7/1997 | Aridas et al. | |
| 6,012,084 A | 1/2000 | Fielding et al. | |
| 6,035,327 A * | 3/2000 | Buckley et al. | 709/206 |
| 6,065,064 A * | 5/2000 | Satoh et al. | 709/249 |
| 6,151,239 A * | 11/2000 | Batra | 365/120 |
| 6,314,468 B1 * | 11/2001 | Murphy et al. | 709/236 |
| 6,347,340 B1 | 2/2002 | Coelho et al. | |
| 6,434,617 B1 | 8/2002 | Clough et al. | |
| 6,553,427 B1 * | 4/2003 | Chang et al. | 719/314 |
| 6,671,728 B1 * | 12/2003 | Mayberry | 709/227 |
| 6,674,767 B1 * | 1/2004 | Kadyk et al. | 370/466 |
| 6,826,621 B1 * | 11/2004 | Kephart et al. | 709/238 |
| 6,980,452 B2 * | 12/2005 | Ogura | 365/49.17 |
| 7,272,836 B1 * | 9/2007 | Taylor | 719/328 |
| 7,394,811 B2 * | 7/2008 | Gibson et al. | 370/392 |
| 7,428,218 B2 * | 9/2008 | Polyakov | 370/241 |
| 7,912,959 B2 * | 3/2011 | Gupta et al. | 709/227 |
| 2002/0129272 A1 * | 9/2002 | Terrell et al. | 713/201 |
| 2003/0033431 A1 * | 2/2003 | Shinomiya | 709/245 |
| 2003/0055974 A1 * | 3/2003 | Brophy et al. | 709/227 |
| 2004/0010545 A1 * | 1/2004 | Pandya | 709/203 |
| 2004/0010612 A1 * | 1/2004 | Pandya | 709/230 |
| 2004/0083284 A1 * | 4/2004 | Ofek et al. | 709/224 |
| 2004/0133656 A1 * | 7/2004 | Butterworth et al. | 709/219 |
| 2004/0158720 A1 * | 8/2004 | O'Brien | 713/176 |
| 2004/0194106 A1 * | 9/2004 | Ogawa | 718/100 |
| 2005/0080950 A1 * | 4/2005 | Rollig et al. | 710/52 |
| 2005/0210004 A1 * | 9/2005 | Focazio et al. | 707/3 |
| 2005/0240943 A1 * | 10/2005 | Smith et al. | 719/328 |
| 2006/0013211 A1 * | 1/2006 | Deerman et al. | 370/389 |
| 2006/0212350 A1 * | 9/2006 | Ellis et al. | 705/14 |
| 2006/0212582 A1 * | 9/2006 | Gupta et al. | 709/227 |
| 2007/0033413 A1 * | 2/2007 | Terrell et al. | 713/183 |
| 2007/0067473 A1 * | 3/2007 | Baikov et al. | 709/230 |
| 2007/0237153 A1 * | 10/2007 | Slaughter et al. | 370/392 |
| 2008/0082678 A1 * | 4/2008 | Lorch et al. | 709/230 |
| 2008/0140877 A1 * | 6/2008 | Baba et al. | 710/23 |

OTHER PUBLICATIONS

Greanier, Todd. "Serialization." [Retrieved Online on Mar. 17, 2009] Jul. 2000. [Retreived from the Internet] <URL: http://java.sun.com/developer/technical/Articles/Programming/serialization/>.*

S. Keshav. "An Engineering Approach to Computer Networking, ATM Networks, the Internet, and the Telephone Network." Copyright 1997 by AT&T. Cover, Title Page and all of Chapter 5 (18 Pages total).*

* cited by examiner

Primary Examiner — Larry Donaghue

(57) ABSTRACT

Systems, methods, and devices are provided for message exchange between software components. One method includes receiving a message request from a software component to send a message to a destination address. The method includes creating a message object which can be exchanged between software components, regardless of a transport mechanism or a protocol employed by one or more software components, upon receiving the request.

20 Claims, 7 Drawing Sheets

US 8,412,826 B2

MESSAGE EXCHANGE BETWEEN SOFTWARE COMPONENTS

BACKGROUND

Interface programs that enable communications between application programs and network functionality have previously been constructed in such a way that information regarding network communication protocols and the format for particular transport mechanisms was fed to the interface program by the application. In such cases, each application program has to maintain an updated knowledge of the set of network protocols and transport mechanisms in order to provide the correct information to the interface program. In other words, a software application program may have to understand the topology of the hardware and software components in order to function correctly. Moreover, each application program may have to be modified to take advantage of new delivery mechanisms and technologies.

A common issue to component based solutions is that, as an application program is scaled in size, software components may have to be moved to other processes and potentially additional machines to provide for increased capacity. Here too, the application programs on a given system may have to be reworked as the relationship between components change. Modifying the proliferating number of application programs on a system to keep up with these changes is labor-intensive and error-prone. Entire programs may have to be analyzed with each change since a bug in a single portion of a given program may bring the entire system/network down.

Further, the interoperation between dissimilar messaging systems and their transport mechanisms may be difficult to accomplish. For example, common object request broker architecture (CORBA), remote procedure call (RPC), socket, Java messaging service (JMS), and Tuxedo are all examples of different transport mechanisms for passing information between software components. These transport mechanisms may not interoperate with each other and often even struggle to interoperate between like message types. It is not uncommon for CORBA implementation to not interoperate with other transport mechanisms. JMS implementations will not interoperate if not provided by the same vendor. This is because JMS defined an application program interface (API) but did not specify the protocol. Sockets provide intercommunication but the applications using the sockets must come to agreement of the message structures, e.g., message format, that will be used over the interface and very often cause the messaging to be tied to a specific hardware architecture.

Consider the case of a network which employs the TCP/IP protocol. This type of network may require that the interface establish a "socket". A socket is a software construct which defines a repository or queue in a computer's operating system for data being transmitted/received, keeps track of various parameters of a communication session, the necessary protocol and command information for the session, etc. In some approaches, an application program requests the creation of a "socket" from a network library. The network library would then provide the communication functionality for various application programs. However, the application program is responsible for informing the network library of the protocol that is to be utilized over the particular network. Further, the application program informs the network library of the address format and various other details of how the addresses are to be administered by the protocol.

A principal difficulty with the above-indicated procedure is that the application program needs to maintain updated records of the most current protocols to enable communications to be successfully accomplished. Thus, each time a protocol is added, each application needs to be revised in order to reflect the most updated version.

The socket creation procedure works well with monolithic applications which employ non-extensible network libraries. That is, some piece of code in some part of an application will always know which protocol is being used or is to be used. In a monolithic application, all developed by a single team, it is reasonable to let such knowledge infiltrate other parts of the application. However, today it is common for different teams to work on different components that make up a software product, and for those components to be used in many applications.

These issues are compounded in systems which convert computer network messages into messages that can be delivered to a wireless device, e.g., a pager, a cellular telephone, a personal communications services (PCS) device, etc. Wireless transport mechanisms include modems, the Internet, ITU standards, TTY (teletype), and TCP transport architectures. Each of these wireless transport mechanisms may support multiple communication protocols. For example, a wireless transport mechanism may have to support the TAP (telocator alphanumeric protocol) for one way alphanumeric paging, the Touch Tone protocol for tone numeric paging, the SOAP (simple object access protocol), various proprietary two-way SMS (short message service) protocols for digital cellular telephones, etc.

DETAILED DESCRIPTION

Figure 1:
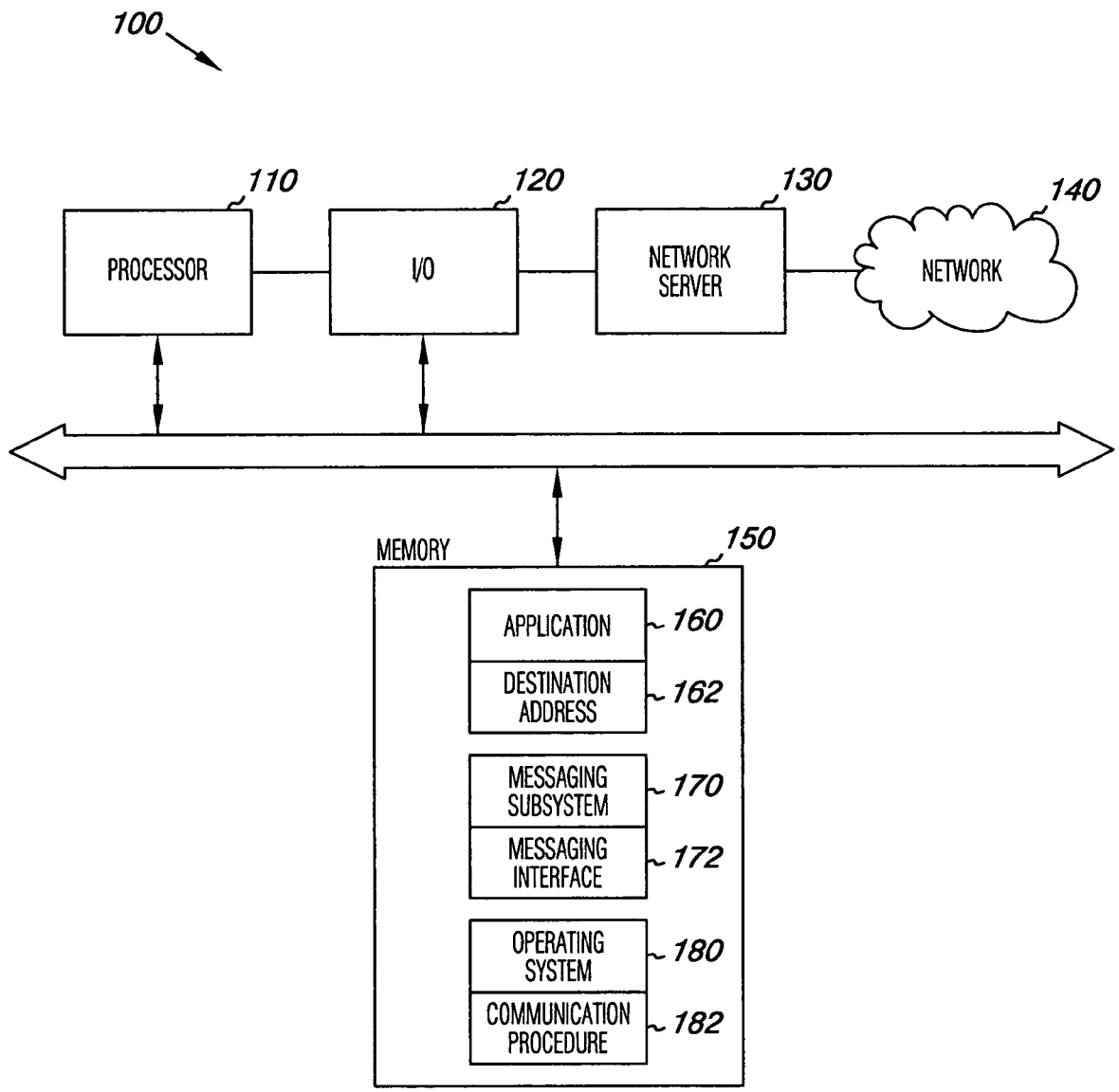
FIG. 1 is a block diagram of an example system including a memory having a messaging subsystem therein according to the embodiments of the invention.

Program instructions are provided as part of a messaging subsystem. The program instructions execute to define an abstraction for messaging and addressing. The "message abstraction" defines the containment of data, e.g., within and/or across processes, and can define a mechanism for serializing the message content. Serialization allows an object content to be encoded on one platform, i.e., a network hardware and software environment, and decoded on another platform creating the same object content in both environments. The "address abstraction" allows a message to be transported without making visible the mechanism for transporting the message to its end point, e.g., destination address. The address abstraction further does not require that a particular application program know the semantic and syntax, e.g., language and grammar, of the delivery. Through such abstraction, one address type can deliver a message to a particular software component located in the same process or in another process located on the same or on different hardware platforms. Another address type may deliver a message to the first software component that is available to perform the work. It is also possible to create an address that would deliver a message to all software components that have registered as handlers of messages sent to the address.

As the reader will appreciate, in operating system parlance a process refers to a running program with input, output, and a state. Each process has one or more threads. A thread is an executable set of instructions being executed by a single processor. A thread is sometimes referred to as a lightweight process. For example, a process contains attributes shared by all executing threads in the process, such as an address space, file descriptors, and variables of an executing instance of a program. Processes and threads are well known in the art and are described, for example, in Modern Operating Systems, Andrew S. Tannenbaum, (1992). As one of ordinary skill in the art will appreciate, a "thread" is a set of executable instructions that can be executed, e.g., "run", on a processor. A thread contains the executable instructions used to execute a task. For example, a thread can represent a client connection in a client/server system. A process can also be thought of as a collection of data that is accessible by a thread and may be shared by a group of threads. A process may contain a single thread or may contain multiple threads.

As will be described in more detail below, the messaging subsystem embodiments abstract the transport mechanism from an application program and create an abstract message and address implementation. The abstract message and address implementation can be utilized in any of the above mentioned transport mechanisms, e.g., CORBA, RPC, sockets, JMS, Tuxedo, etc., without the application programs knowing the transport mechanisms or their associated protocols.

The messaging subsystem is employed using object technology which is a known methodology for designing and programming. In object technology, implemented using object oriented programming, systems are designed with building blocks that contain both the data and the processing, e.g., the "attributes" and the "methods," as the same will be recognized by those in the art. C++ and Java are examples of object oriented programming languages.

Object oriented programming is a form of modular programming with rules that allow pieces of software to be reused and interchanged between programs. Major concepts are encapsulation, inheritance and dependencies. Encapsulation is the creation of self-sufficient modules that contain the data and the processing, e.g., attributes (data structures) and methods (functions), that manipulate that data. These encapsulated, abstract data types are called "object classes." The attributes (data structures) and methods (functions) within the object classes are referred to as instances or objects within an object class. For example, in a payroll system, a class could be defined as Manager, and Pat and Jan, the actual objects, are instances of that class. Classes are created in hierarchies, and inheritance allows the knowledge in one class to be passed through the hierarchy. That means less programming is required when adding functions to complex systems. For example, if a step is added at the bottom of a hierarchy, then only the processing and data associated with that unique step needs to be added. Everything else about that step is inherited by the other classes. Dependencies between classes refer one class using the attributes (data structures) and methods (functions) of another class.

Exemplary System

FIG. 1 is a block diagram of an example system 100 including a memory 150 having a messaging subsystem embodiment 170 storable therein. Described in more detail below, the messaging subsystem 170 provides message exchange capabilities between software components in different locations within and/or across one or more networks and systems.

The exemplary system 100 shown in FIG. 1 can encompass one or more networks. A network connected device, e.g., laptop, desktop, server, router, hub, switch, PDA, cell phone, etc., can include a processor 110 and an input/output module 120. The reader will appreciate that more than one processor may be provided on a given network connected device. Input/output module 120 provides a communication interface with a network server 130 which, in turn, communicates over a network 140 and multiple entities, including different networks and systems connected thereto. A network can be thought of as a planned hardware and software environment. A system can include multiple different networks. Embodiments are not limited to use with the illustrative system of FIG. 1.

The processor 110 operates in conjunction with various programs and data stored in memory 150. It is to be understood that memory 150 may be a combination of random access memory (RAM) and persistent memory such as is provided by a disk drive, e.g., read only memory (ROM). Memory 150 can contain one or more application programs 160, at least one of which includes an address string 162 designating an address of a component connected to the network 140 and/or multiple entities connected thereto, to which a message can be dispatched. As used herein a component refers to a software component which can reside on various network connectable devices such as a router, hub, switch, server, printer, workstation, desktop, laptop, cellphone, handheld multifunction device, etc. The application programs resident on the various network connectable devices will have particular, associated communication procedures 182, e.g., protocols and address formats, written into their programs as relevant to the particular operating system 180 on which the program was designed to run.

For example, in computer networks if the address string format is: "15.62.42.17", the address string is an IP string and is subject to the IP protocol. Similarly if the address string format is "foo.hp.com" it is also an IP string. By contrast, if the address string format is: "abfffDG:bf080009EE92." it is an IPX (internetwork packet exchange) string and is subject to the associated protocol. Further, if the address string is: "0800096534ac", it is an Ethernet string and is subject to the associated protocol. As noted above, wireless networks similarly have a myriad of address formats and associated protocols.

According to embodiments, a messaging interface 172 as part of the messaging subsystem 170, e.g., provided to memory 150, includes program instructions which execute to receive a message request from a software component of an application program, regardless of the address string and message format and associated protocol (e.g., destination address 162 will have a particular format associated with a particular protocol). The program instructions of the messaging interface 172 will then execute to define an abstraction for the message and address such that one software component can exchange messages with another software component unfettered by the topology, e.g., changing transport mechanisms and associated protocols, between locations of the software components. Thus, as software components, networks, and system interconnections scale in size, messages will be exchangeable across processes, processors, networks, and systems without the particular application programs having knowledge thereof.

Exemplary Use Case Information

Figure 2:
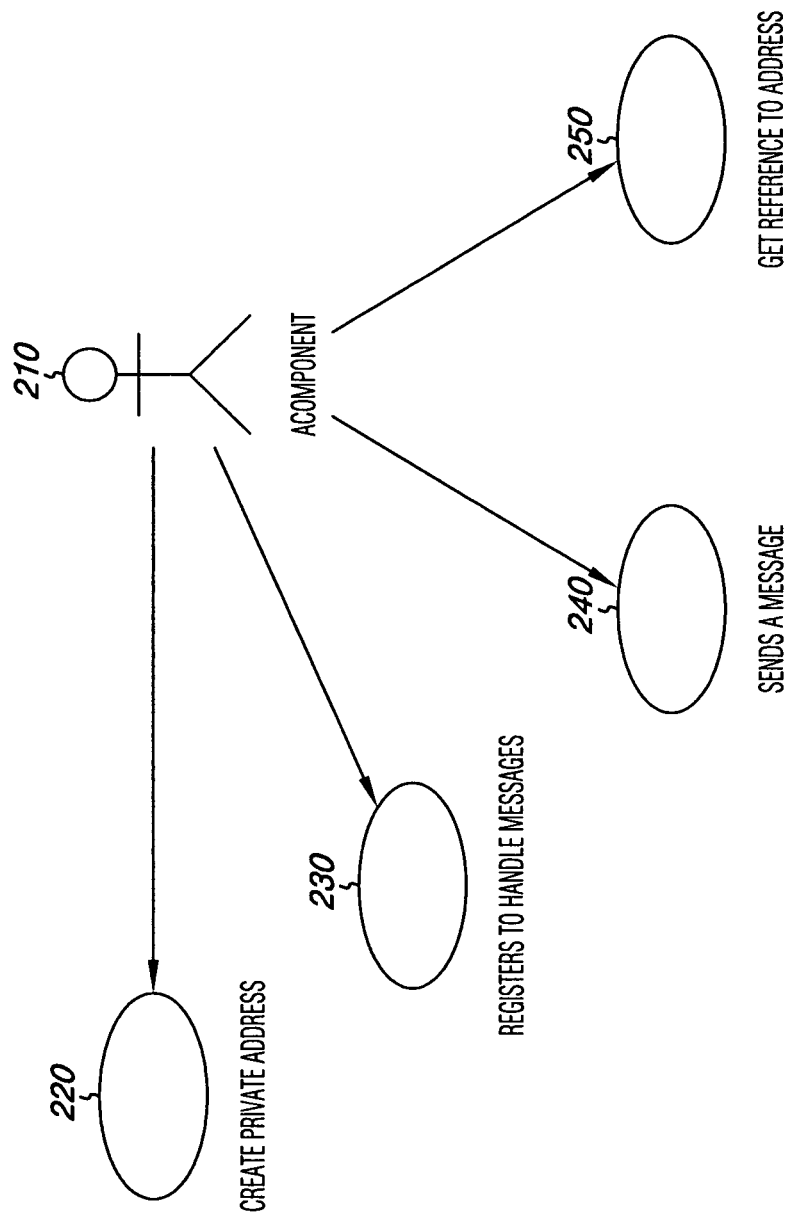
FIG. 2 illustrates an embodiment of a software component as an actor with a set of use cases representing the capabilities of the messaging subsystem.

FIG. 2 illustrates an embodiment of a software component 210 as an actor (e.g., in C++ programming a software component which acts on another object is often represented as actor 210, shown labeled "ACOMPONENT") with a set of use cases representing the capabilities of the messaging subsystem, e.g., 170 in FIG. 1. In various embodiments, a software component, such as component 210, on a given network device will interact with the messaging interface of the messaging subsystem to create a private address, such as address 220, register to handle messages 230, send a message 240, and get a reference to an address 250. Each of these actions is described in more detail in connection with the use case scenario embodiments discussed in connection with FIGS. 4-7.

Exemplary Classes for Message Subsystem

Figure 3:
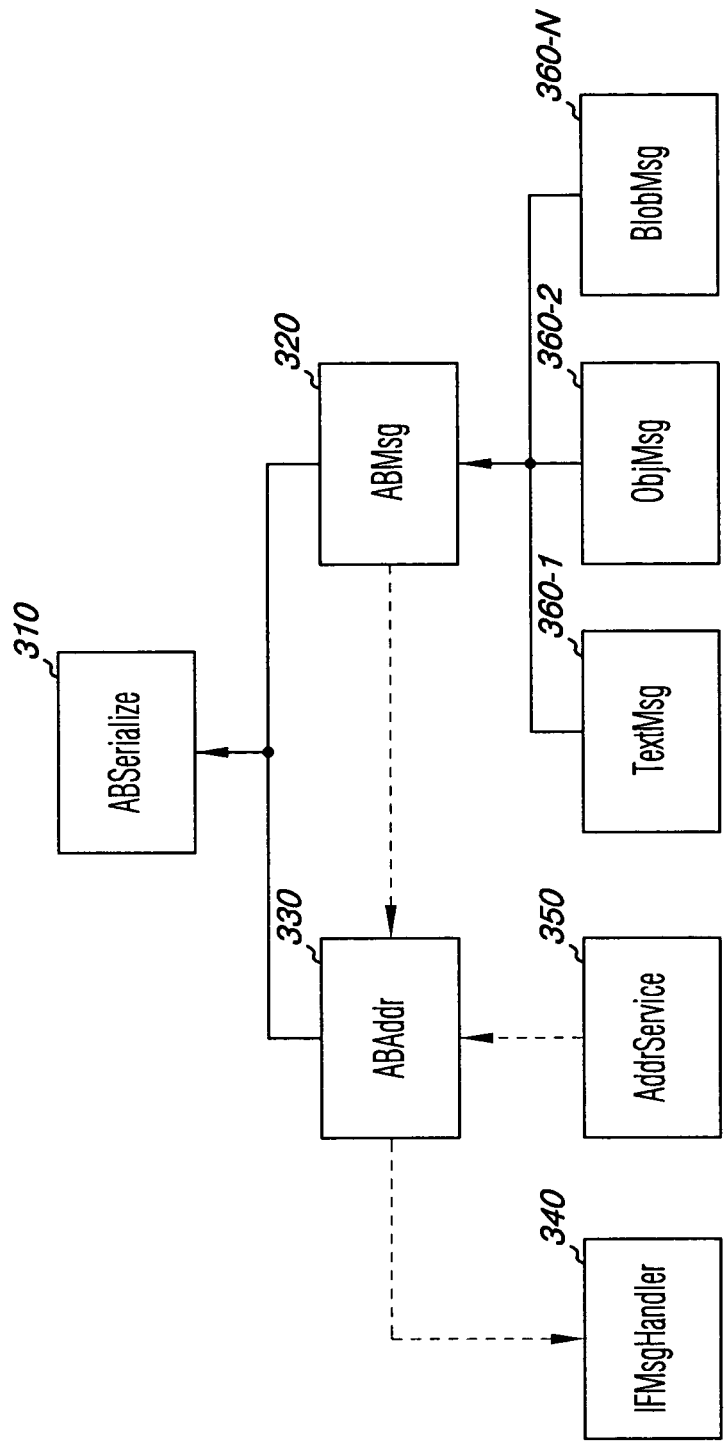
FIG. 3 shows a universal modeling language (UML) class diagram illustrating embodiments of classes that can be included with messaging subsystem embodiments.

FIG. 3 shows a universal modeling language (UML) class diagram illustrating embodiments of classes that can be included with a messaging subsystem as described herein. In other words, FIG. 3 represents the classes that can be included in the embodiments of the message subsystem. In FIG. 3, the solid arrow lines designate "inheritance" and the dashed arrow lines indicate "dependencies" as the same are known and understood according to object oriented programming.

According to embodiments, and illustrated in FIG. 3, an abstract serialize class 310 (labeled "ABSerialize") is provided by the executing program instructions of the messaging subsystem (e.g., 170 in FIG. 1). As noted above, within each class are the attributes (data structures) and methods (functions) that manipulate that data, i.e., the executable program instructions to perform functions associated with a given class. For example, according to embodiments, program instructions associated with the ABSerialize class executes instructions to encode the object content on one platform, i.e., network system operating environment, and decode the object content on another platform thus creating the same object content in both environments. One of ordinary skill in the art will appreciate the manner in which serialization allows an object content to be encoded on one platform and decoded on another platform to create the same object content. As shown in FIG. 3, the abstract serialize class 310 inherits (represented by the solid line) both a "message abstraction" class 320 (labeled "ABMsg") and an "address abstraction" class 330 (labeled "ABAddr").

The message abstraction class 320 defines the containment of data and a mechanism for serializing the message content. The "message abstraction" defines the containment of data, e.g., within and/or across processes, and can define a mechanism for serializing the message content. The message abstraction class, ABMsg 320, can be created by execution of the program instructions of the message interface as part of the messaging subsystem described herein. The ABMsg 320 uses the ABAddr 330 class, e.g., has as a dependency (indicated by the dashed arrow line).

The address abstraction class, ABAddr 330, is also created by execution of the program instructions of the message interface as part of the messaging subsystem described herein. The address abstraction class 330 defines an abstract address such that a message can be transported without a sending software component (e.g., the "actor" 210 in FIG. 2) having to know in advance the mechanism for transporting the message to an intended, recipient software component. As such, sending software component will not have to know the semantic and syntax, e.g., language and grammar, of the delivery.

As shown in FIG. 3, ABAddr 330 uses, e.g., has as a dependency, an interface message handler class 340 (labeled as "IPMsgHandler"). The IFMsgHandler 340 is created by execution of the program instructions of the message interface as part of the messaging subsystem described herein. Processes of the IFMsgHandler 340 are used by the ABAddr 330. An address service class 350 (labeled as "AddrService") is likewise created by execution of the program instructions of the message interface as part of the messaging subsystem. The AddrService 350 uses, e.g., has as a dependency, the ABAddr 330 class.

Messages, 360-1, 360-2, . . . , 360-N (labeled in FIG. 3 as "TextMsg", "BlobMsg", "ObjMsg"), are additionally created as object classes by execution of the program instructions of the message interface as part of the messaging subsystem. A text message, blob (binary list of bytes, e.g., array of bytes), and object message are used here to illustrate that the embodiments are not limited to any particular type of message. Further, the designator "N" is used to indicate that embodiments are not limited to a particular number of messages that may be handled by the message interface. As illustrated by the solid arrow lines the TextMsg, BlobMsg, and ObjMsg, e.g., 360-1, 360-2, . . . , 360-N, are inherited by the ABMsg 320.

According to embodiments, these classes facilitate a messaging system between objects classes thus allowing applications to be written to a simple message and address abstraction. As such, an application will not be dependent on the underlying transport for semantic or syntax. Underlying transport/delivery mechanisms, e.g., CORBA, RPC, sockets, JMS, Tuxedo, etc., can be changed without impact to the application programs. Accordingly, using address and messaging abstraction embodiments described herein enables network hardware and software components to be scaled, e.g., added, replaced, or removed, without modification to other software application programs. Using the messaging subsystem described herein, it is possible to build gateways simply by forwarding messages between "abstract" addresses, unconstrained by different transport mechanisms and protocols in the system topology between locations.

Exemplary Send Message

Figure 4:
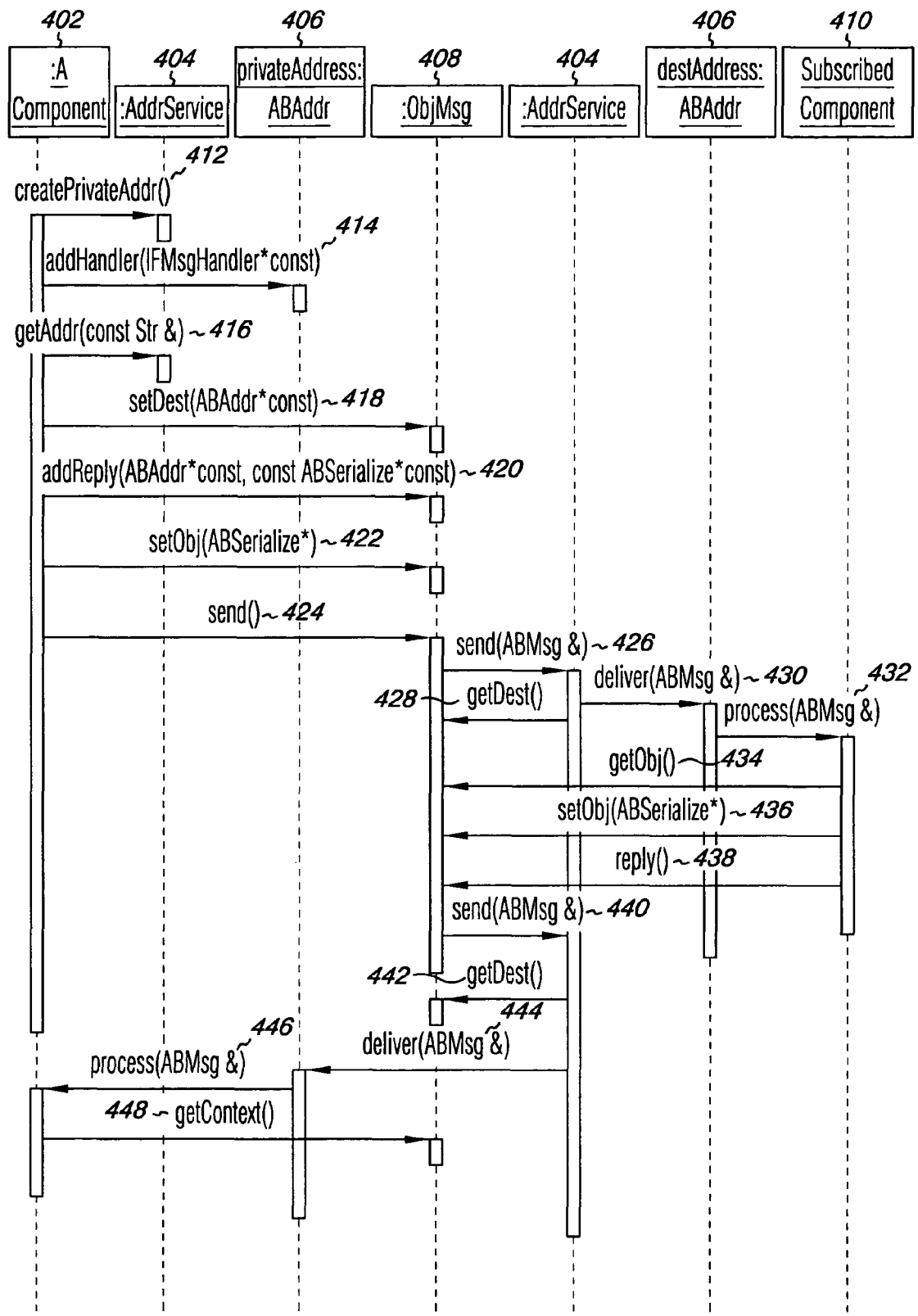
FIG. 4 is a sequence diagram illustrating a use case scenario embodiment in which a software component, e.g., software application, sends a message using the messaging subsystem.

FIG. 4 is an object oriented sequence diagram illustrating a use case scenario embodiment in which a software component, e.g., software application, sends a message using the messaging subsystem. This use case scenario illustrates the sending of a message using the message subsystem embodiments. In the embodiment of FIG. 4, a software component will create a "private" address that it will register to handle. The software component will then get a reference to the address by "ID" that it wants the message to go to. Such information can be retrieved in association with the loading of the message.

As the reader will appreciate, the sequence diagram of FIG. 4 is illustrated in universal modeling language (UML). Accordingly, the boxes shown across the top of FIG. 4 illustrate various instance of object classes, having various attributes (data structures) and method (functions), as described in connection with FIG. 3. The object class instances illustrated in the embodiment include a software component 402 (as can exist in memory of a network device), the address service (AddrService) 404, the abstract address (ABAddr) 406, the object message (ObjMsg) 408, and a subscribed software component 410 (to which the message is intended). The vertical lines shown in FIG. 4 represent the context of the object class instance listed above and the horizontal lines indicate the interaction between these instances of the object classes with the arrows indicating the direction of the interaction. That is, the horizontal lines indicate the invocation of a method on the object class instance at the arrow end. The object classes AddrService 404 and ABAddr 406 are repeated and numbered similarly, for ease of illustration and to avoid unnecessary overlap of the arrow lines between the instances of the object classes.

According to various embodiments, a software component 402 of an application on the network (e.g., 160 in FIG. 1) will request the message interface (e.g., 172 in FIG. 1) of the messaging subsystem (e.g., 170 in FIG. 1) to send a message. As noted above, the message interface executes instructions to create the various classes described in connection with FIG. 3.

As shown at 412, an instance of the software component 402 will request the creation of a private address (described further in FIG. 5) from an instance of the AddrService 404. The private address will be used by the software component as a reply address. As noted with FIG. 3, the AddrService 404 is dependent upon, i.e., uses, the ABAddr 406 object class which in turn includes dependency on the IFMsgHandler (shown in FIG. 3) object class including particular processes as objects. At 414 the instance of the software component defines itself as a handler (labeled "IFMsgHandler") for messages that arrive at the private address with an instance of the ABAddr object class 406. At 416 the instance of the software component will retrieve the address reference for the "ID" associated with the destination address (described further in FIG. 6) from an instance of the AddrService 404. At 418 the instance of the software component will set ID associated with the destination address and provide this to an instance of the message class (ObjMsg) 408. That is, the returned reference for the ID associated with the destination address will be loaded into the message as the destination.

At 420, the instance of the software component will also add the reply address to provide to the instance of the ObjMsg 408. That is, the software component will additionally add the private address and optionally a context object. At 422, the instance of the software component will set the content of the message to provide to the instance of the ObjMsg 408. Here, the software component loads the content of the message and serializes the message content. The serialization allows an object content, i.e., message, to be encoded on one platform and decoded on another creating the same object content in both environments. This serialization thus allows an object message to cross process and system boundaries. At 424, the instance of the software component provides a request, in exchange with the instance of the ObjMsg 408, for the so configured message to send itself.

At 426, the now abstract message is sent from the instance of the ObjMsg 408 to the instance of AddrService 404. Here the message does any needed preparation and delegates the send function to the messaging subsystem. At 428, the instance of the AddrService 404 gets the destination of the message from the instance of the ObjMsg 408 and then proceeds to deliver the message as shown at 430 to an instance of the ABAddr 406 having the destination address. In other words, here the messaging subsystem requests that the abstract address deliver the message. To achieve the same, the instance of the ABAddr 406 interacts with an instance of a particular subscribed component 410 which is the intended recipient of the message as shown at 432. That is, the IFMsgHandler which has registered for the abstract address is invoked with the message. This IFMsgHandler performs the logic to enable a serialized message to cross process and/or system boundaries providing an appropriate transport mechanism for transporting the message to its intended end point. Again, it is noted that by virtue of the embodiments, the semantics and syntax for the transport mechanism does not have to be known by the application which requested the sending of the message.

At 434, the instance of a particular subscribed component 410 gets the object content, i.e., abstract message, from the instance of the ObjMsg 408. In other words, here the processing component would get a reference to the contained object so that the processing component can perform work on the object that was delivered in the abstract message. At 436, the instance of the particular subscribed component 410 serializes and sets the object content, i.e., reply abstract message with the reply address, interacting with the ObjMsg 408. That is, when the processing component has created the information that is to be returned to the original application which requested the sending of the message it sets the content of the reply abstract message. At 438, the instance of the particular subscribed component 410 then requests the instance of the ObjMsg 408 to reply. Here the processing component that received the original message will tell the reply abstract message to resend itself back the original application based on the content of the included reply address.

At 440, the instance of the ObjMsg 408 sends the reply abstract message to the instance of the AddrService 406. Here the reply abstract message will manipulate the content of the list of reply addresses to ultimately set the destination to the last address that was added to the reply address set. At 442, the instance of the AddrService 406 will get the abstract reply address from the instance of the ObjMsg 408. In other words, the messaging subsystem will get the reply destination address for the message. At 444, the instance of the AddrService 404 will deliver the reply abstract message to the instance of the ABAddr 406. Hence at 444 the message is delivered to the address which in this case is the private address created by the original application.

At 446, the instance of the ABAddr 406 interacts once again with the instance of the original software component 402 to process the reply abstract message. In other words, the reply abstract address gives the abstract message to the IFMsgHandler that registered on the private address. At 448, the instance of the original software component 402 gets the context from the instance of the ObjMsg 408. Here the context information that was loaded by the original application can be retrieved from the abstract message.

Exemplary Create Private Address

Figure 5:
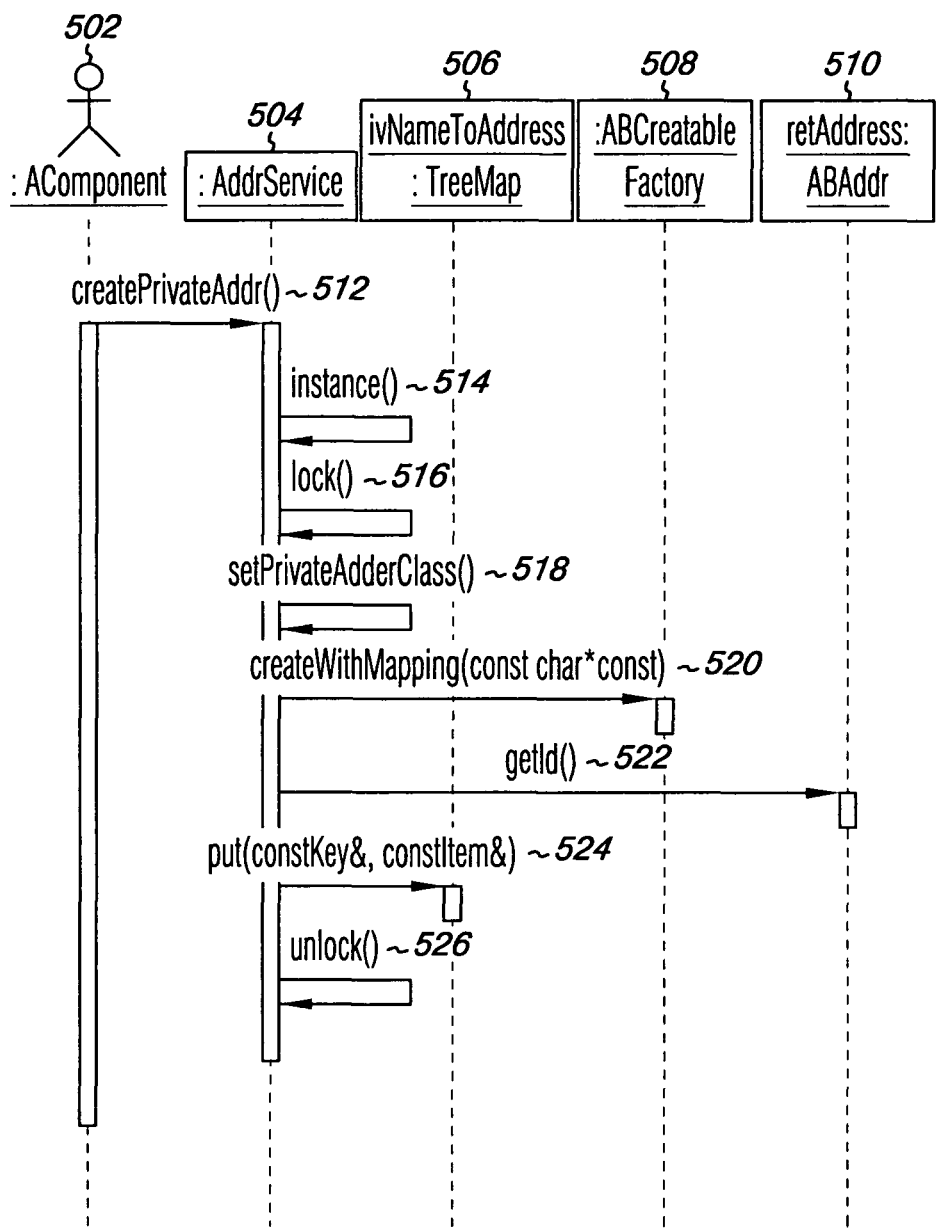
FIG. 5 is a sequence diagram illustrating a use case scenario embodiment for a sequence of events to create a private address using the messaging subsystem.

FIG. 5 is a sequence diagram illustrating a use case scenario embodiment for a sequence of events to create a private address using the messaging subsystem. The sequence diagram of FIG. 5 is again illustrated in the universal modeling language (UML). Accordingly, the boxes shown across the top of the Figure illustrate various object class instances and "singletons" of these object classes as shown in connection with FIG. 3. As the reader will appreciate a "singleton", in object oriented programming parlance, is a class which only allows a single instance of itself to be created, and usually gives simple access to that instance. Often, a system only needs to create one instance of a class, and that instance will be accessed throughout a program and shared among various software components. Examples would include objects needed for logging, communication, database access, etc. If a system only needs one instance of a class, and that instance needs to be accessible in many different components of a system, it is possible to control both instantiation and access by making that class a singleton. The object class instances and singletons illustrated in the embodiment FIG. 5 include a software component 502 (as can exist in memory of a network device), the address service (AddrService) 504, an attribute of the AddrService singleton (labeled "ivNameToAddress: TreeMap") 506, a singleton ABCreateableFactory 508 (i.e., the factory for objects in the system), and the abstract address (ABAddr) 510.

As above, the vertical lines shown in FIG. 5 are the context instances of the object classes listed above and the horizontal lines indicate the interaction between these instances of the object classes with the arrows indicating the direction of the interaction. The horizontal lines indicate the invocation of a method on the object class at the arrow end.

This use case scenario illustrates the use of the messaging subsystem to create a private address that can be used. The private address is an address that is a universally addressable end point, e.g., destination address, within the system. A private address has only one registered message handler associated with it at any time. In the embodiment of FIG. 5, an instance of the software component will make a request of an instance of the AddrService 504 to create a private address as shown at 512. At 514, the instance of the AddrService 504 gets a handle to the singleton of the AddrService. In this embodiment the singleton of the AddrService class is the one instance of the AddrService object class 504 that will be accessed throughout a program and may be accessible in many different parts of a system. If this singleton has not been made the method will create an instance thereof for the messaging subsystem. At 516, the instance of the AddrService 504 will interact with the singleton of the AddrService 504 to lock the context of the singleton to block access by other threads within the process.

At 518, the instance of the AddrService 504 will interact with the singleton of the AddrService 504 to get the class for the private address. This information will come from the configuration of the messaging subsystem. At 520, the instance of the AddrService 504 will interact with another singleton, e.g., the singleton ABCreatableFactory 508 in this example. In this embodiment, the singleton ABCreateableFactory 508 is the one instance of the ABCreateableFactory class 508 that will create an object, e.g., abstract address, of a specified type (labeled as "createWithMapping"). In this disclosure, this is the class that is used to create any of the creatable objects. According to the embodiments, the type of object returned is checked to an ABAddr (described above) to make sure it is of the appropriate type for use in the system.

At 522, the instance of the AddrService 504 will interact with an instance of the ABAddr 510 to ask the newly created object for its ID, e.g., reference ID as described above. The sequence of the interaction with the object controls the way the object works. If the first question asked is for the ID then the abstract address will create a name that is unique and addressable from the system. If the first invoke of the newly created object is getiD then the object does the work necessary to allow for the connection to the abstract address based on the information provided. At 524, the instance of the AddrService 504 will interact with the singleton attribute ivNameToAddress 506 to store the provided ID in the map within this particular process. Then, at 526, the instance of the AddrService 504 will unlock the context to allow other threads to access to the messaging subsystem, i.e., the AddrService 504 instance.

Exemplary Get Reference Address

Figure 6:
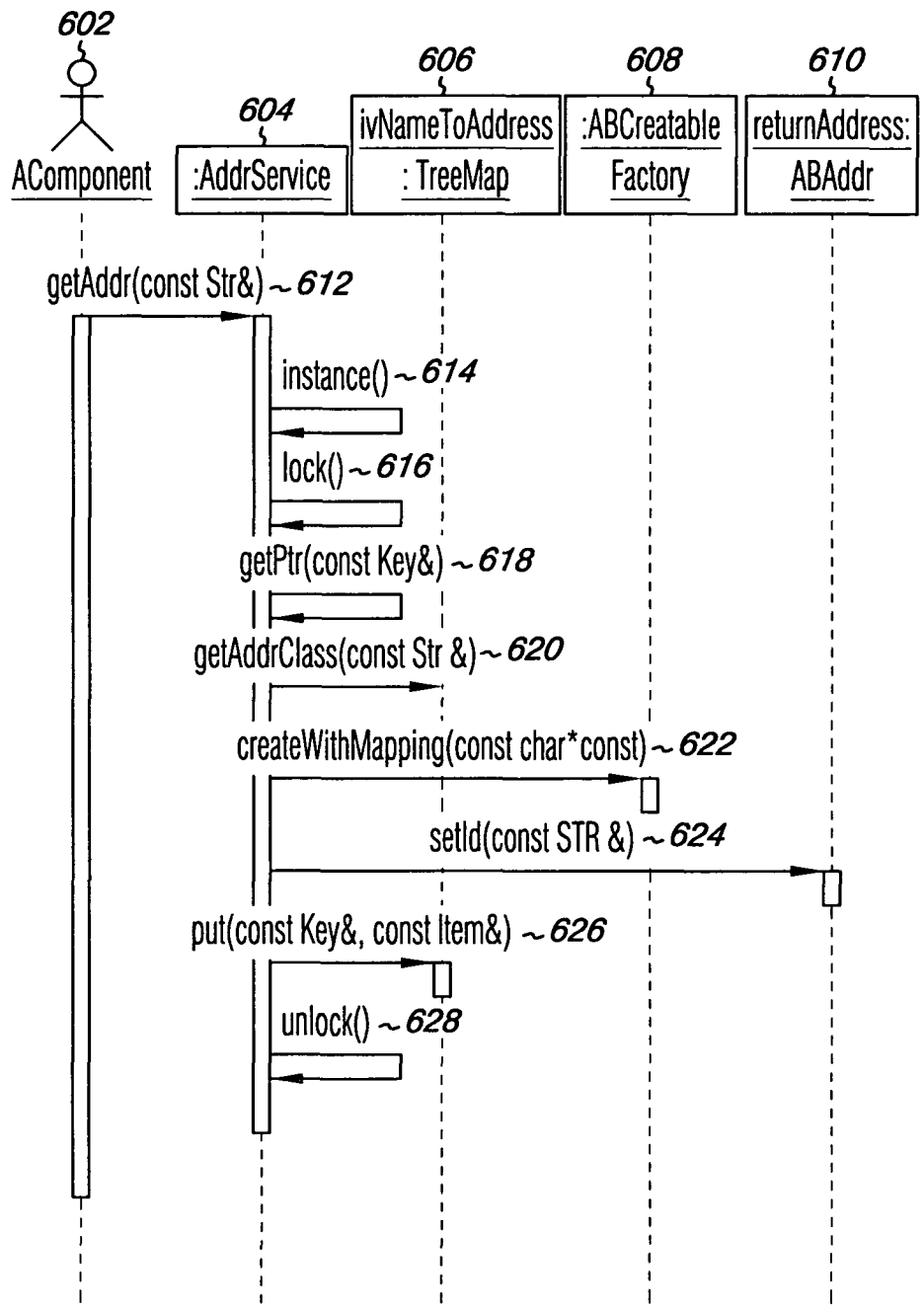
FIG. 6 is a sequence diagram illustrating a use case scenario embodiment for a sequence of events to get an address reference using the messaging subsystem.

FIG. 6 is a sequence diagram illustrating a use case scenario embodiment for a sequence of events to get an address reference using the messaging subsystem. FIG. 6 is again a UML diagram as described in connection with FIGS. 4 and 5. The object class instances and singletons illustrated in the embodiment FIG. 6 include a software component 602, the AddrService 604, the AddrService attribute ivNameToAddress 606, the singleton ABCreateableFactory 608, and the ABAddr 610.

The use case scenario illustrates the ability to get a reference to an object based on the unique ID described above. This sequence embodiment provides an example where the address by the name specified is not found. Therefore, the steps that are performed include the creation of a new address as shown at 612.

In FIG. 6, an instance of the software component 602 will request from an instance of the AddrService 604 a reference to an address based on the above described ID. At 614, a reference to the singleton is retrieved to provide the control of the singleton creation. That is, a check will be made to see if the AddrService instance exists and if it does not it will be created. At 616, access to the singleton is locked to avoid threading issues as mentioned in connection with FIG. 5. At 618, a map of names to address is used to lookup the address that is requested. The instance of the AddrService is interacting with the singleton attribute ivNameToAddress 606. At 618, what is returned is a pointer to the entry in the table or NULL if the entry is not found. For this exemplary sequence, the address is not found, so NULL is returned. If a non-NULL value is returned, the reference would be returned to the component 602.

At 620, the AddrService 604 determines the class name of the address implementation associated with the provided reference ID. This is done by invoking the getAddrClass method on the AddrService singleton 604. This method will be invoked with the reference ID and will return the class name associated with the reference ID. At 622, the instance of the AddrService 604 will interact with the ABCreateableFactory 608. Again, in this disclosure, this is the class that is used to create any of the creatable objects. Using this class, an object of the type that should be created for the particular class name is created. Further, using this class, an object of the type that should be created for the particular ID is checked to ABAddr to make sure that the object created is actually usable and an abstract address.

At 624, the instance of the AddrService 604 will interact with an instance of the ABAddr 610 to set the ID for the abstract address that is created. This could cause the configuration for the object to be loaded based on the kind of abstract address that was created. At 626, the instance of the AddrService 604 interacts with instance variable ivNameToAddress 606 to add an entry to the map for the newly created address. Then, at 628, the instance of the AddrService 604 will unlock the singleton to allow other threads access to the messaging subsystem, i.e., the AddrService 604 instance.

Exemplary Communication Framework

Figure 7:
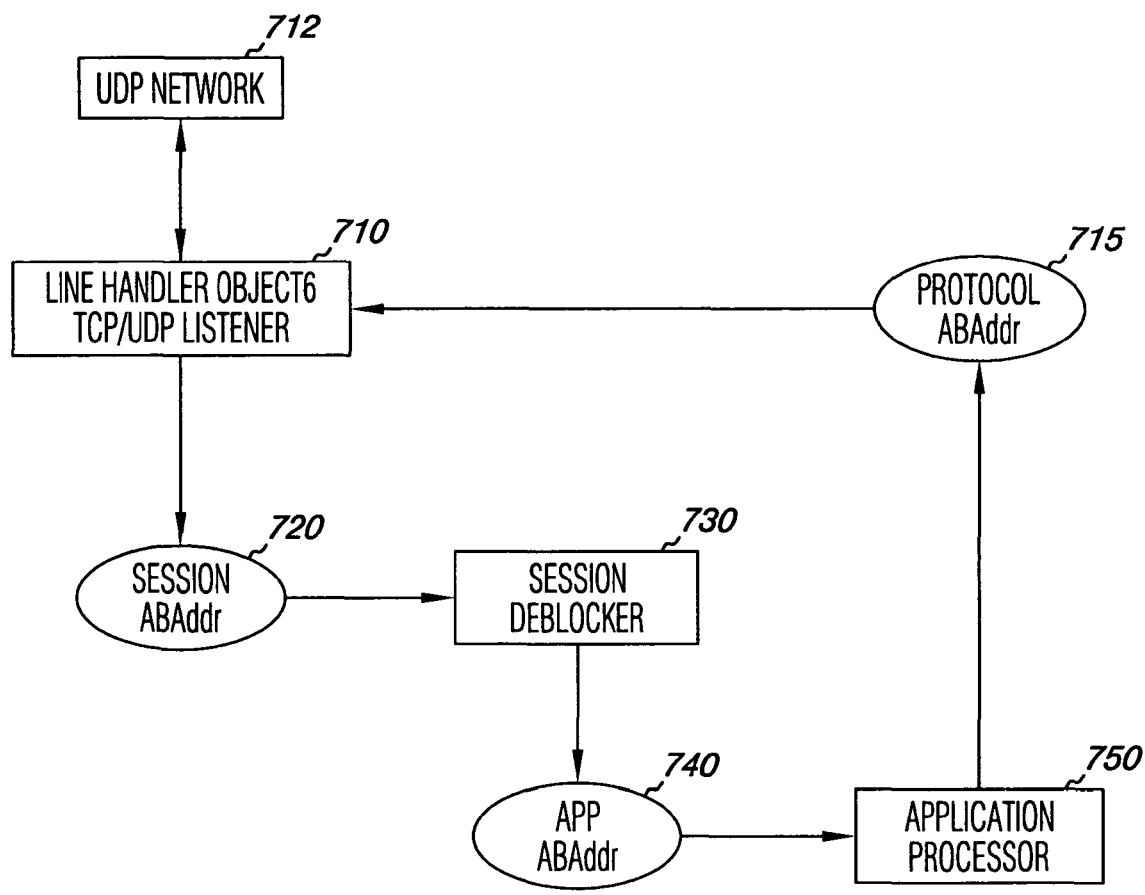
FIG. 7 illustrates a framework embodiment to allow messaging between software components.

FIG. 7 illustrates one communication framework embodiment to allow messaging between software components. As described in the Figures above, classes have been used to create a messaging subsystem between components. These classes execute instructions to perform various functions and tasks as discussed in connection with FIGS. 3-6. The framework embodiment shown in FIG. 7 is a representation of C++ objects implementing the relationships in FIGS. 3-6 such that objects can be loaded and operated on to intercommunicate within and among various network topologies. The reader will appreciate that the embodiments are not limited to the example framework illustrated in FIG. 7.

In FIG. 7, the blocks represent software components which may be resident in memory on one or more network devices within the system such as the system shown in FIG. 1. The ovals represent various ABAddr instances queues and the same will be appreciated by one familiar with object oriented programming. The rectangles (blocks) represent software components which will be using the ABAddr instances to intercommunicate.

In FIG. 7, a line handler 710 object can receive data from other software components and/or an external UDP (user datagram protocol) network 712. In the embodiment of FIG. 7, the line handler 710 is illustrated as a transmission control protocol (TCP)/user datagram protocol (UDP) listener, e.g., TCP/UDP socket. That is, the line handler 710 is shown receiving (e.g., "listening" for) ABMsg(s) (abstract message(s)) from a protocol ABAddr 715 which could be receiving ABMsg(s) from one or more software components. According to the embodiments described above, the format of the data is not interpreted by the line handler 710. That is, an application component does not have to inform the line handler 710 of the protocol that is to be utilized over a particular network. Additionally, the application component does not have to inform a network library of the address format and various other details of how the addresses are to be administered by the protocol. Instead, the raw data received from the UDP network is placed in a Message object that is an ABMsg(s) as the same has been illustrated in connection with FIGS. 3-6. The destination address on the ABMsg is "set" to a Session ABAddr 720 and the return (reply) address for the ABMsg is set to the Protocol ABAddr 715 associated with the line handler 710 that received the information. The message object, i.e., ABMsg, is sent to the destination address as set for the abstract message (Session ABAddr 720). An "abstract address", described above, will perform the logic necessary to deliver the message to any object that has registered as the IFMsgHandler for the address. This may include serializing, e.g., encoding, the object and crossing process boundaries, or it may simply cause an invocation of the process method on an object that has registered with a particular ABAddr instance. In either case, the registered object and the sending object are unaware of the actions taken by the abstract address object to deliver the message object. That is, the registered object and the sending object are unaware of the underlying transport/delivery mechanisms, e.g., CORBA, RPC, sockets, JMS, Tuxedo, etc.

In FIG. 7, a session deblocker 730 receives the raw message from the Session ABAddr 720 and performs the logic necessary to decode/deblock the application messages from the data stream. This information is placed in an application message with the reply address and destination address set appropriately. Next, the ABMsg is sent from the session deblocker 730 to an application ABAddr 740. The application ABAddr feeds the appropriate application component 750 which has registered as the particular IFMsgHandler for the Application (APP) ABAddr 740. That is, the APP ABAddr 740 feeds an object that has registered as the IFMsgHandler for the address and can cause an invocation of the process method on the object registered at the application component 750 or proceeds to serialize, e.g., encode, the ABMsg for crossing process boundaries. In this manner, the appropriate application component 750 will perform the application logic. Ultimately, the reply address in the application message will be used to direct the results of the application logic, e.g., performed at application component 750, to the appropriate line handler, e.g., as shown connecting back through Protocol ABAddr 715 for the particular line handler 710. The location of the application component 750 can be anywhere within the sending application's process or processor and/or on a different process or processor. These processes and processors can additionally be on the same network, e.g., LAN, and/or on a different network altogether.

This framework allows for the implementation of application logic in the form of a single class with many of the software components, e.g., blocks in the drawing, being reused from application to application regardless of the scaling, transport mechanisms, and protocols for one or more networks. Abstract address implementations allow for message transport scenarios which include but are not limited to the following: generic queues (first available server gets the next message from the queue); inter-object queue which allows for a single object within any process to service the address; object to object within a process, etc. The reader will appreciate a process boundary as defining a complete unit of work received according to a particular protocol.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
   a processor; and
   a memory coupled to the processor, wherein the memory includes program instructions executable by the processor to implement a messaging subsystem to:
   register a first software component as a message handler corresponding to a first abstract address;
   register a second software component as a message handler corresponding to a second abstract address;
   provide the first abstract address to the second software component identifying the first software component as an intended message recipient;
   receive a message request from the second software component to send a message to the first abstract address;
   upon receiving the request, create an abstract serialized class to enable encoding on one platform and decoding on another platform; and
   receive a message object from the second software component having object content including message content serialized by the second software component using the abstract serialized class, the message object including the first abstract address as the destination address and the second abstract address as a reply address, wherein the first and second software components are located on different network devices.

2. The device of claim 1, where the message object comprises:
the message;
the destination address;
a message abstraction that defines containment of the message; and
the first abstract address configured to mask the destination address from a component that handles the message object.

3. The device of claim 1, wherein the device includes program instructions that execute to create a message object which can be exchanged between software components across different processes, across different processors, and across different networks.

4. The device of claim 1, wherein the program instructions are part of an object oriented messaging interface.

5. The device of claim 4, wherein the object oriented messaging interface executes instructions to create a number of abstract serialized classes comprising:
an abstract message class;
an abstract address class;
an interface message handler class including particular processes as objects; and
an address service class.

6. The device of claim 1, wherein the device includes program instructions that execute to create the message object which can be serialized to allow encoding on one platform and decoding on another platform.

7. The device of claim 1, wherein the device includes program instructions that execute to maintain a same object content in two different network environments.

8. The device of claim 1, wherein the memory further includes program instructions executable by the processor to implement a messaging subsystem to send the message object via a transportation mechanism to the first software component based on the first abstract address within the message object.

9. A method for message exchange, comprising:
registering a first software component as a message handler corresponding to a first abstract address;
registering a second software component as a message handler corresponding to a second abstract address;
providing the first abstract address reference to the second software component for an ID associated with the first software component;
receiving a message request from the second software component to send a message to the first abstract address reference;
upon receiving the request, creating a mechanism to serialize the message; and
receiving a message object from the second software component having object content including message content serialized by the second software component using the abstract serialized class, where the message object comprises the message, a message abstraction that defines the mechanism to serialize the message, the first abstract address as a destination address, the second abstract address as a return address, and an address abstraction that masks the destination address from an application program handling the message object,
wherein the first and second software components are located on different network devices.

10. The method of claim 9, wherein the method includes serializing the message object and exchanging the message object across different processes, across different processors, and across different networks.

11. The method of claim 9, including:
providing a message object address implementation which can utilize a number of different transport mechanisms on one or more networks.

12. The method of claim 11, wherein providing a message object address implementation which can utilize a number of different transport mechanisms on one or more networks includes:
creating an abstract message class;
creating an abstract address class;
creating an interface message handler class including particular processes as objects; and
creating an address service class.

13. The method of claim 9, wherein the method includes:
serializing the message object;
encoding an object content on one platform corresponding to the second software component; and
decoding the object content on another platform corresponding to the first software component.

14. The method of claim 9, wherein the method includes maintaining a same object content in two different network environments.

15. The method for message exchange of claim 9, further comprising:
requesting the first abstract address deliver the message; and
invoking, in response to the request to deliver the message, the first software component as the message handler to perform logic to enable a serialized message to cross process and/or system boundaries in transporting the message to an intended end point.

16. A system, comprising:
a number of network devices coupled by a network; and
at least one memory including program instructions executable by a processor to implement a messaging subsystem to:
register a first software component as a message handler corresponding to a first abstract address;
register a second software component as a message handler corresponding to a second abstract address;
provide the first abstract address reference to the second software component identifying the first software component as an intended message recipient;
receive a message request from the second software component to send a message to the first abstract address; and
create a mechanism to serialize the message to enable encoding on one platform and decoding on another platform;
receive a message object from the second software component having object content including the message serialized by the second software component using the abstract serialized class, the message object being exchangeable between the software components, regardless of changing transport mechanisms or protocols employed between locations of the software components, the message object including the first abstract address as the destination address and the second abstract address as a reply address; and
send the message object via a the changing transportation mechanism to the first software component based on the first abstract address within the message object,
wherein the first and second software components are located on different network devices, and semantics and syntax for the changing transportation mechanisms are not provided to the second software component.

17. The system of claim 16, wherein the first abstract address masks semantic and syntax of message object delivery from an application program handling the message object.

18. The system of claim 16, wherein the program instructions execute to exchange the message object between the first and second software components across different processes, across different processors, and across different networks.

19. The system of claim 18, wherein the program instructions execute to serialize the message object for exchanging the message object across different processes, across different processors, and across different networks.

20. The system of claim 16, wherein the program instructions execute to:
- create an abstract message class;
- create an abstract address class;
- create an interface message handler class including particular processes as objects; and
- create an address service class.

\* \* \* \* \*

UNITED STATES PATENT AND TRADEMARK OFFICE
CERTIFICATE OF CORRECTION

PATENT NO. : 8,412,826 B2  
APPLICATION NO. : 11/085377  
DATED : April 2, 2013  
INVENTOR(S) : James A. Lamb et al.

Page 1 of 1

It is certified that error appears in the above-identified patent and that said Letters Patent is hereby corrected as shown below:

In the Specifications:

In column 10, line 4, before "use" delete "The" and insert -- This --, therefor.

In the Claims:

In column 14, line 63, in Claim 16, before "changing" delete "the".

Signed and Sealed this
Sixth Day of August, 2013

Teresa Stanek Rea
*Acting Director of the United States Patent and Trademark Office*